United States Patent
Ushanov et al.

(10) Patent No.: US 10,078,686 B2
(45) Date of Patent: Sep. 18, 2018

(54) COMBINATION FILTER FOR SEARCH QUERY SUGGESTIONS

(71) Applicant: YANDEX EUROPE AG, Lucerne (CH)

(72) Inventors: Dmitry Valerievich Ushanov, Moscow (RU); Alisa Dmitrievna Lavrentyeva, Moscow (RU); Ilya Aleksandrovich Gruntov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/511,734

(22) PCT Filed: Feb. 2, 2016

(86) PCT No.: PCT/IB2016/050522
§ 371 (c)(1),
(2) Date: Mar. 16, 2017

(87) PCT Pub. No.: WO2017/001939
PCT Pub. Date: Jan. 5, 2017

(65) Prior Publication Data
US 2018/0101600 A1      Apr. 12, 2018

(30) Foreign Application Priority Data

Jun. 30, 2015    (RU) ................................ 2015125827

(51) Int. Cl.
*G06F 17/30* (2006.01)
*G06F 15/18* (2006.01)
*G06F 17/18* (2006.01)

(52) U.S. Cl.
CPC ........ *G06F 17/30646* (2013.01); *G06F 15/18* (2013.01); *G06F 17/18* (2013.01);
(Continued)

(58) Field of Classification Search
CPC ......... G06F 17/30864; G06F 17/30873; G06F 2216/15; G06F 17/30672; G06F 17/30389;
(Continued)

(56) References Cited

U.S. PATENT DOCUMENTS 6,065,056 A    5/2000 Bradshaw et al.
6,564,213 B1   5/2003 Ortega et al.
(Continued)

FOREIGN PATENT DOCUMENTS

CN    103064853 A    4/2013
JP    2010-033197 A  2/2010
(Continued)

OTHER PUBLICATIONS

International Search Report from PCT/IB2016/050522, dated May 23, 2016, Lee W. Young.
(Continued)

*Primary Examiner* — Michelle Owyang
(74) *Attorney, Agent, or Firm* — BCF LLP

(57) ABSTRACT

There is disclosed a method and a system for generating a search query completion suggestion. The method comprises receiving at least a portion of a search query and determining a first query component therein. A suggested second query component related to the first query component is generated, the search query completion suggestion containing the first query component and the suggested second query component. A list of potentially banned words is accessed to determine if the first query component matches any of the potentially banned words maintained therein. It is then determined if the potentially banned word is associated with a ban marker or an unban marker. A list of ban or unban markers respectively is accessed to determine if the suggested second query component matches any of the ban or
(Continued)

unban markers maintained therein, the search query completion suggestion being generated or not generated accordingly.

20 Claims, 5 Drawing Sheets

(52) U.S. Cl.
CPC ...... *G06F 17/3053* (2013.01); *G06F 17/3064* (2013.01); *G06F 17/3097* (2013.01); *G06F 17/30389* (2013.01); *G06F 17/30867* (2013.01); *G06F 17/30926* (2013.01)

(58) Field of Classification Search
CPC ......... G06F 17/30424; G06F 17/30477; G06F 17/3064; G06F 17/3097
USPC .................................................. 707/705–780
See application file for complete search history.

(56) References Cited

U.S. PATENT DOCUMENTS

| | | | |
|---|---|---|---|
| 7,725,485 B1 | 5/2010 | Sahami et al. | |
| 7,831,610 B2 | 11/2010 | Takata et al. | |
| 8,176,069 B2 | 5/2012 | Timm et al. | |
| 8,392,453 B2* | 3/2013 | Baluja ................ | G06F 17/2735 707/713 |
| 8,583,675 B1* | 11/2013 | Haahr ............... | G06F 17/30442 707/721 |
| 8,719,246 B2 | 5/2014 | Williams et al. | |
| 8,751,520 B1 | 6/2014 | Bhattacharjee et al. | |
| 8,924,409 B1 | 12/2014 | Roskind | |
| 2004/0054661 A1* | 3/2004 | Cheung ............. | G06F 17/30864 |
| 2007/0050352 A1 | 3/2007 | Kim | |
| 2007/0192318 A1 | 8/2007 | Ramer et al. | |
| 2008/0243808 A1 | 10/2008 | Rieman et al. | |
| 2010/0318903 A1* | 12/2010 | Ferren .................. | G06F 3/0237 715/259 |
| 2012/0117102 A1 | 5/2012 | Meyerzon et al. | |
| 2012/0296927 A1 | 11/2012 | Velipasaoglu | |
| 2013/0018872 A1 | 1/2013 | Velipasaoglu | |
| 2013/0041655 A1 | 2/2013 | Spears | |
| 2013/0226953 A1 | 8/2013 | Markovich | |
| 2014/0006371 A1 | 1/2014 | Richardson et al. | |
| 2014/0358957 A1 | 12/2014 | Chang et al. | |
| 2014/0379689 A1 | 12/2014 | Huffman et al. | |
| 2015/0365393 A1* | 12/2015 | Shyamsunder ... | G06F 17/30876 726/4 |
| 2016/0246805 A1* | 8/2016 | Long .................. | G06F 17/3053 |

FOREIGN PATENT DOCUMENTS

| | | |
|---|---|---|
| RU | 2013140370 A | 3/2015 |
| WO | 2009012084 A2 | 1/2009 |

OTHER PUBLICATIONS

Diakopoulos, Sex, Violence, and Autocomplete Algorithms, Words banned from Bing and Google's autocomplete algorithms, http://www.slate.com/articles/technology/future_tense/2013/08words_banned_from_bing_and_google_s_autocomplete_algorithms.single.html, retrieved Dec. 8, 2014, 9 pages.
English Abstract of RU2013140370 retrieved on Espacenet on Mar. 15, 2017.
Sullivan, "How Google Instant's Autocomplete Suggestions Work", 2011.
International Search Report from PCT/IB2016/050522, dated Dec. 30, 2016.

* cited by examiner

COMBINATION FILTER FOR SEARCH QUERY SUGGESTIONS

CROSS-REFERENCE

The present application claims priority to Russian Patent Application No 2015125827, filed Jun. 30, 2015, entitled "COMBINATION FILTER FOR SEARCH QUERY SUGGESTIONS" the entirety of which is incorporated herein.

FIELD

The present technology relates to search engines in general and specifically to a method and apparatus for generating a search query completion suggestion.

BACKGROUND

Various global or local communication networks (the Internet, the World Wide Web, local area networks and the like) offer a user a vast amount of information. The information includes a multitude of contextual topics, such as but not limited to, news and current affairs, maps, company information, financial information and resources, traffic information, games and entertainment related information. Users use a variety of client devices (desktop, laptop, notebook, smartphone, tablets and the like) to have access to rich content (like images, audio, video, animation, and other multimedia content from such networks).

Generally speaking, a given user can access a resource on the communication network by two principle means. The given user can access a particular resource directly, either by typing an address of the resource (typically an URL or Universal Resource Locator, such as www.webpage.com) or by clicking a link in an e-mail or in another web resource. Alternatively, the given user may conduct a search using a search engine to locate a resource of interest. The latter is particularly suitable in those circumstances, where the given user knows a topic of interest, but does not know the exact address of the resource she is interested in.

When the given user runs a web search using the search engine, he or she generally has two priorities. He or she wants the search engine to locate the most relevant results and he or she wants the results relatively quickly. To at least partially address these concerns, it is known to present the user using a search engine with query suggestions. For example, in response to a user typing a query "Molly" into the Google™ search engine, the user gets a list of suggestions in a drop down menu, namely "Molly Ringwald", "Molly Maid", etc. The general idea behind the suggestions is to enable a more user-friendly search experience and to assist the user in exploring a subject of interest. For example, the user may not know exactly what query will provide the information he or she wants; search suggestions can help the user to find desired or related information. The user then can browse the search results and select a link that he or she is desirous of perusing.

Thus, in order to assist the person conducting the search, a search engine can suggest additional queries to the searcher. There are a variety of technologies the search engine can use to identify the additional queries, and each of these technologies will typically result in a large set of queries that the engine can potentially suggest. However, presenting the entire set is often not desirable because many of the queries may contain offensive language or relate to illegal activities and the like.

U.S. Pat. No. 8,719,246 issued on May 6, 2014 to Williams et al. teaches methods and computer-storage media for generating and presenting a suggested search query. Responsive to receiving a user-devised search parameter, a suggested search query is identified. A suggested search query might be generated using various techniques, such as by applying an n-gram language model. A classification of the suggested search query is determined, and the suggested search query is presented together with a visual indicator, which signifies the classification. In some cases, the search system includes a search-query assistant including a suggested-query filter and a data-cleanup function that removes noisy parameters and/or generated suggestions.

U.S. Patent Application Publication No. 2007/0192318 published on Aug. 16, 2007 to Ramer et al. teaches a method and system for operating a mobile search suggestion dictionary. A list of expected search queries associated with a search vertical is created, the list is ordered based on at least one factor, and the ordered list of search queries is presented to a mobile communication facility for user selection. In some cases, an authorization to view certain content such as adult content may be used by an individual to set an authorization using a logged administrator's request. For example, a parent may want to ensure that their child is not able to be presented adult content on a mobile communication facility. An authorization facility may have key words that an administrator can accept or block from a search query entered into the query entry facility of the child's mobile communication facility. An authorization facility may combine elements of a taxonomy-based authorization with a keyword-based authorization.

U.S. Pat. No. 7,725,485 issued on May 25, 2010 to Sahami et al. teaches systems and methods for generating query suggestions using contextual information. A search engine receives a query from an end-user. The search engine executes the query on a content database and identifies a set of matching content. The search engine utilizes the matching content to generate a query vector describing the end-user query. The search engine searches a repository of other vectors, called "centroids," to produce a ranked set of centroids matching the query vector. These centroids are converted into search queries and form a set of candidate queries. The search engine filters the candidate queries to identify ones that are likely to be meaningful to the end-user. The selected candidate queries are returned to the end-user as query suggestions.

SUMMARY

It is an object of the present technology to ameliorate at least some of the inconveniences present in the prior art.

In one aspect, implementations of the present technology provide a method of generating a search query completion suggestion. The method can be executable at a server. The method comprises receiving at least a portion of a search query, and parsing the at least a portion of the search query to determine a first query component. A suggested second query component related to the first query component is generated. The search query completion suggestion contains the first query component and the suggested second query component.

A list of potentially banned words is accessed to determine if the first query component matches any of the potentially banned words maintained therein, each of the potentially banned words being associated with one of a ban marker and an unban marker. In some implementations, one or more of a list of potentially banned words, a list of ban markers, and a list of unban markers had been predetermined manually by an operator or by using a machine-learned algorithm, such as a machine-learned algorithm generated based on historical user search data.

Responsive to the first query component matching any one of the potentially banned words, it is determined if the potentially banned word is associated with the ban marker or the unban marker.

Responsive to a determination that the potentially banned word is associated with the ban marker, a list of ban markers is accessed to determine if the suggested second query component matches any of the ban markers maintained therein. Responsive to the suggested second query component matching any one of the ban markers, the search query completion suggestion is not generated, whereas, responsive to the suggested second query component not matching any one of the ban markers, the search query completion suggestion is generated for the at least a portion of the search query.

Responsive to a determination that the potentially banned word is associated with the unban marker, a list of unban markers is accessed to determine if the suggested second query component matches any of the unban markers maintained therein. Responsive to the suggested second query component matching any one of the unban markers, the search query completion suggestion is generated for the at least a portion of the search query, whereas, responsive to the suggested second query component not matching any one of the unban markers, the search query completion suggestion is not generated.

In some implementations, the potentially banned words in the list of potentially banned words have been grouped by type. The type may be, for example and without limitation, one or more of drugs, people, people curses, people actions, adult content, illegal content, pornography, gambling, profanity, and sexual content.

In some aspects, therefore, implementations of the present technology provide a method further comprising determining the type of potentially banned word matching the first query component, prior to accessing the list of ban markers or the list of unban markers. In some implementations, the list of ban markers that is accessed comprises only ban markers corresponding to the type of potentially banned word matching the first query component. In some implementations, the list of unban markers that is accessed comprises only unban markers corresponding to the type of potentially banned word matching the first query component.

In some implementations, responsive to a determination that the potentially banned word is associated with neither a ban marker nor an unban marker, further steps in the method are not executed and the search query suggestion is not generated.

In some implementations, the suggested second query component is generated based at least partially on past related search queries. In an embodiment, the suggested second query component is generated based on one or more of: (i) statistical popularity of a given suggested second query component; (ii) user-specific popularity of the given suggested second query component; (iii) how often the given suggested second query component is typically searched along with the at least a portion of the search query; and (iv) other auxiliary information associated with past searches executed by other (or the same) user.

The first query component and the suggested second query component may independently comprise one or more than one word.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
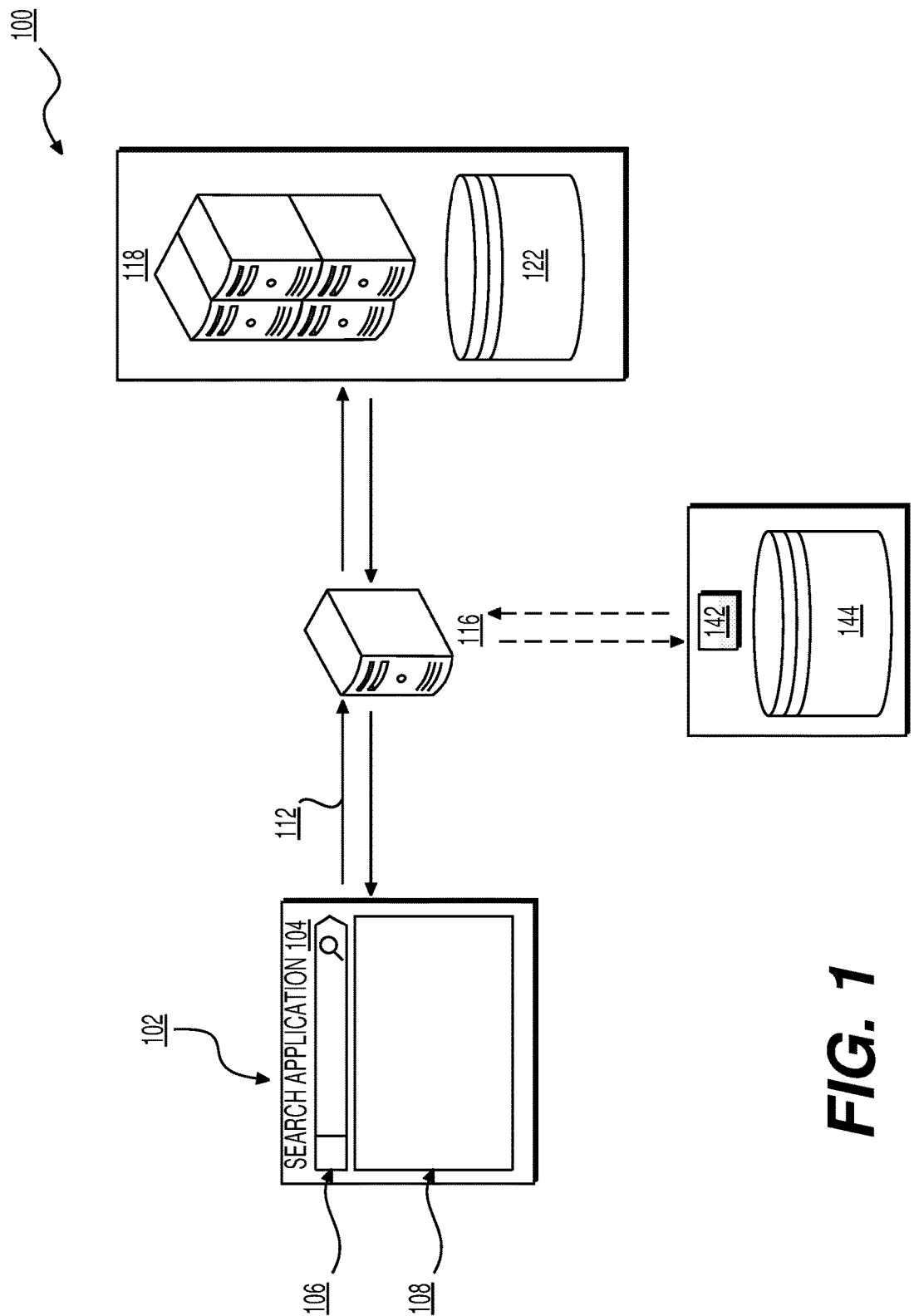
FIG. 1 is a schematic diagram depicting a system, the system being implemented in accordance with non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to receive search queries and to conduct web searches (e.g., general searches, vertical searches) in response thereto, as well as to process search queries in accordance with non-limiting embodiments of the present technology. As such, any system variation configured to process user search queries can be adapted to execute embodiments of the present technology, once teachings presented herein are appreciated.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered, or the like.

The implementation of the electronic device 102 is not particularly limited, but as an example, the electronic device 102 may be implemented as a personal computer (desktops, laptops, netbooks, etc.), a wireless communication device (such as a smartphone, a cell phone, a tablet and the like), as well as network equipment (such as routers, switches, and gateways).

The electronic device 102 comprises hardware and/or software and/or firmware (or a combination thereof), as is known in the art, to execute a search application 104. Generally speaking, the purpose of the search application 104 is to enable the user (not depicted) to execute a search, such as the above mentioned web search using the above-mentioned search engine.

How the search application 104 is implemented is not particularly limited. One example of the search application 104 may include a user accessing a web site associated with a search engine to access the search application 104. For example, the search application can be accessed by typing in an URL associated with Yandex™ search engine at www.yandex.ru. It should be expressly understood that the search application 104 can be accessed using any other commercially available or proprietary search engine.

In alternative non-limiting embodiments of the present technology, the search application 104 may be implemented as a browser application on a portable device (such as a wireless communication device). For example (but not limited to) those implementations, where the electronic device 102 is implemented as a portable device, such as for example, Samsung™ Galaxy™ SIII, the electronic device may be executing a Yandex browser application. It should be expressly understood that any other commercially available or proprietary browser application can be used for implementing non-limiting embodiments of the present technology.

Generally speaking, the search application 104 comprises a search query interface 106 and a search result interface 108. The general purpose of the search query interface 106 is to enable the user (not depicted) to enter his or her query or a "search string". The general purpose of the search result interface 108 is to provide search results that are responsive to the user search query entered into the search query interface 106. How the user search query is processed and how the search results are presented will be described in detail herein below.

Also coupled to a communication network (not depicted) is a server 116. The server 116 can be implemented as a conventional computer server. In an example of an embodiment of the present technology, the server 116 can be implemented as a Dell™ PowerEdge™ Server running the Microsoft™ Windows Server™ operating system. Needless to say, the server 116 can be implemented in any other suitable hardware, software, and/or firmware, or a combination thereof. In the depicted non-limiting embodiments of the present technology, the server 116 is a single server. In alternative non-limiting embodiments of the present technology, the functionality of the server 116 may be distributed and may be implemented via multiple servers.

The electronic device 102 is configured to communicate with the server 116 over a communication link 112. Generally speaking, the communication link 112 enables the electronic device 102 to access the server 116 via the communication network (not depicted).

In some non-limiting embodiments of the present technology, the communication network (not depicted) can be implemented as the Internet. In other embodiments of the present technology, the communication network (not depicted) can be implemented differently, such as any wide-area communication network, local-area communication network, a private communication network and the like.

How the communication link 112 is implemented is not particularly limited and will depend on how the electronic device 102 is implemented. Merely as an example and not as a limitation, in those embodiments of the present technology where the electronic device 102 is implemented as a wireless communication device (such as a smartphone), the communication link 112 can be implemented as a wireless communication link (such as but not limited to, a 3G communication network link, a 4G communication network link, Wireless Fidelity, or WiFi® for short, Bluetooth® and the like). In those examples where the electronic device 102 is implemented as a notebook computer, the communication link 112 can be either wireless (such as Wireless Fidelity, or WiFi® for short, Bluetooth® or the like) or wired (such as an Ethernet based connection).

The server 116 is communicatively coupled (or otherwise has access) to a search cluster 118. According to some embodiments of the present technology, the search cluster 118 performs web searches (e.g., general and/or vertical searches) in response to the user search queries inputted via the search query interface 106 and outputs search results to be presented to the user using the search results interface 108. Within these non-limiting embodiments of the present technology, the search cluster 118 comprises or otherwise has access to a database 122. As is known to those of skill in the art, the database 122 stores information associated with a plurality of resources potentially accessible via the communication network (for example, those resources available on the Internet). The process of populating and maintaining the database 122 is generally known as "crawling". It should be expressly understood that in order to simplify the description presented herein below, the configuration of the search cluster 118 has been greatly simplified. It is believed that those skilled in the art will be able to appreciate implementational details for the search cluster 118 and for components thereof.

Within the embodiment depicted in FIG. 1, the server 116 is generally configured to (i) conduct searches (e.g., by accessing the search cluster 118); (ii) execute analysis of search results and perform ranking of search results; (iii) group search results and compile the search result page (SERP) to be outputted to the electronic device 102.

According to non-limiting embodiments of the present technology, the server 116 is further configured to generate a search query completion suggestion for the user entering at least a portion of a search query into the search query interface 106. As is known to one skilled in the art, search suggestion is a feature whereby, responsive to the user entering a search query or at least a portion of a search query, the search application 104 provides search suggestions related to the search query. For example, where the user has started typing in: "Molly Ringwald" and has only entered "Molly", possible search query completion suggestions may include "Molly Ringwald", "Molly Ringwald movies", "Molly Maid", "Molly side effects" and the like. In accordance with embodiments of the present technology, the server 116 is configured to generate search query completion suggestions. For purposes of illustration only, in the examples described herein, search query completion suggestions are referred to as text strings, phrases, or words, however it should be expressly understood that the type of search query completion suggestion generated is not particularly limited. For example, a search query completion suggestion could be an image, an audio recording, text, etc.

To that end, the server 116 comprises or has access to a suggestion module 142. The operation of the suggestion module 142 within the context of generating a search query completion suggestion for a search query according to non-limiting embodiments of the present technology will now be described.

In the depicted non-limiting embodiment of the present technology, the suggestion module 142 is a single suggestion module. In alternative non-limiting embodiments of the present technology, the server 116 can be communicatively coupled (or otherwise has access) to a plurality of suggestion modules (not depicted). The suggestion module 142 can be configured to generate query suggestions for queries of any type. In some embodiments, a given implementation of the suggestion module 142 can be responsible for generating query completion suggestions of a particular type. For example, merely for the purposes of ease of illustration, suggestion module 142 may be implemented as a suggestion module for generating search query completion suggestions for search query components relating to drugs. Additional suggestion modules for generating additional search query completion suggestions, for example for search query components related to people, people curses, people actions and the like, may be included. It should be expressly understood that a number of additional or different services can be implemented as part of the plurality of suggestion modules (not depicted), and that the number of modules within the plurality of suggestion modules is not meant to be limited.

In the depicted non-limiting embodiment of the present technology, suggestion module 142 comprises or has access to one or more database 144. In alternative non-limiting embodiments of the present technology having a plurality of suggestion modules (not depicted), it should be understood that any given one of the plurality of suggestion modules (not depicted) comprises or has access to one or more databases (not depicted). These one or more databases host data associated with the particular services implemented by the given one of the plurality of suggestion modules (not depicted). In some embodiments of the present technology, the suggestion module 142 can be implemented as part of the search cluster 118.

To the extent that suggestion module 142 has access to database 144, recalling that the suggestion module 142 implements generation of search query completion suggestions, the database 144 contains lists of potentially banned words 146, lists of ban markers, and lists of unban markers. Additionally or optionally and, as known to those skilled in the art, the one or more databases 144 may be segregated into one or more separate databases (not depicted). These segregated databases may be portions of the same physical database or may be implemented as separate physical entities. For example, one database within, let's say, the database 144 could host the list of potentially banned words 146, while another database within the database 144 could host the lists of ban and unban markers. Needless to say, the above has been provided as an illustration only and several additional possibilities exist for implementing embodiments of the present technology.

Figure 2:
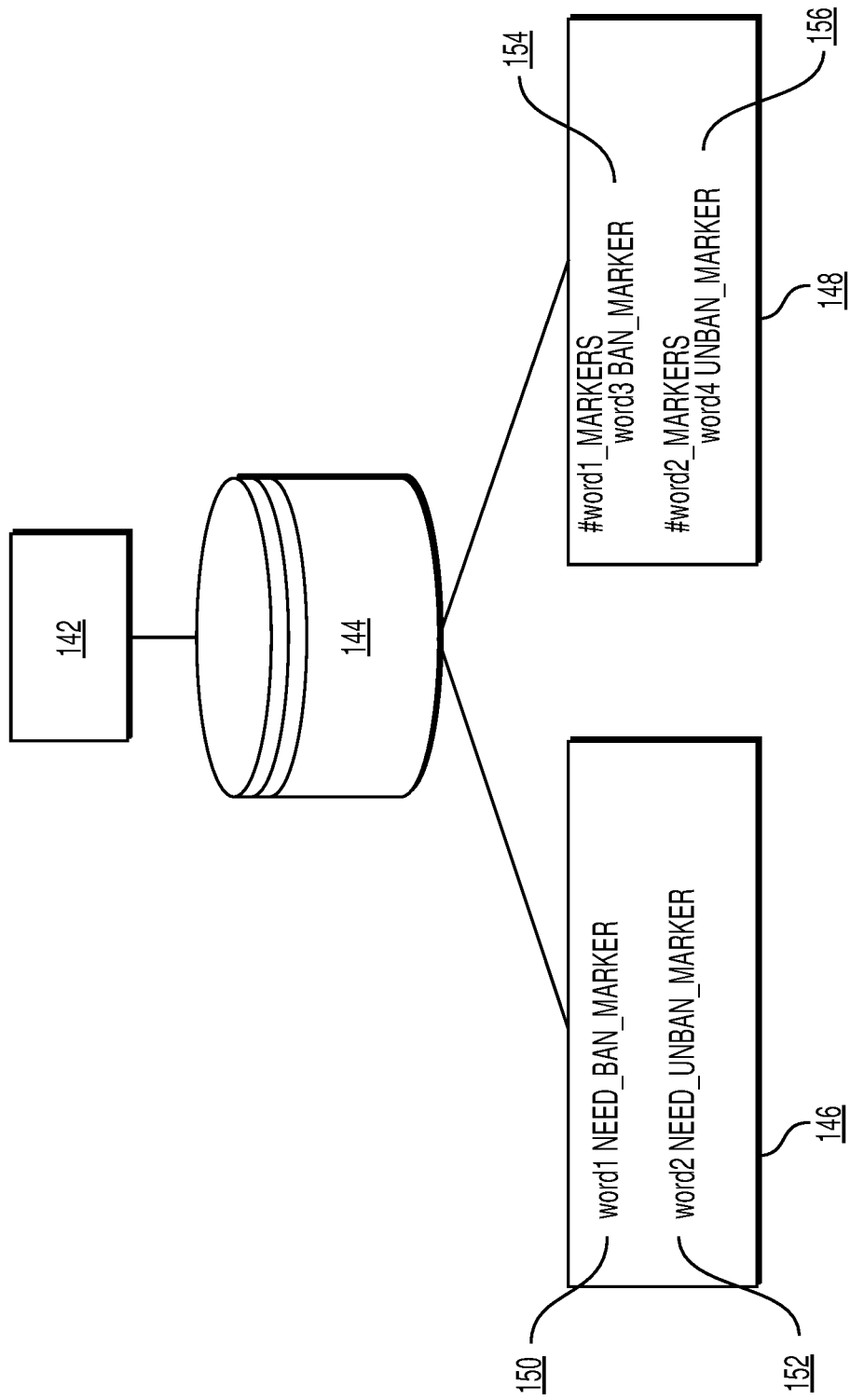
FIG. 2 is a schematic representation of a suggestion module and an associated database of the system of FIG. 1, the suggestion module and the associated database being implemented in accordance with non-limiting embodiments of the present technology.

In order to fully appreciate implementations of the present technology, an example of the suggestion module 142 and database 144 will be described in greater detail now. With reference to FIG. 2, there is depicted a schematic diagram of the suggestion module 142 and the database 144, much akin to the one in FIG. 1.

According to non-limiting embodiments of the present technology, the suggestion module 142 is configured to generate search query completion suggestions from the at least a portion of a search query in response to the user search queries (or the at least a portion thereof) inputted via the search query interface 106. Upon receiving at least a portion of a search query from the user via the search query interface 106, the suggestion module 142 is configured to parse the at least a portion of the search query to determine a first query component and to generate a suggested second query component related to the first query component, the search query completion suggestion containing the first query component and the suggested second query component. The database 144 contains the list of potentially banned words 146 and a list of ban and unban markers 148.

In the depicted non-limiting embodiment shown in FIG. 2, the list of ban and unban markers 148 contains both ban and unban markers. In other words, the ban and unban markers are combined into one list (not shown). In alternative non-depicted embodiments, the lists of ban markers and unban markers may be present in separate lists. For example, the database 144 may contain a list of ban markers, and a separate list of unban markers.

Implementation of lists of ban markers and unban markers is not particularly limited and other permutations are possible, as is known to those of skill in the art.

In the depicted non-limiting embodiment shown in FIG. 2, the list of potentially banned words 146 contains the potentially banned words word1 150 and word2 152. Word1 150 is associated with a ban marker, indicated by the phrase "NEED_BAN_MARKER" in the depicted non-limiting embodiment shown in FIG. 2. Accordingly, if the first query component (not depicted) matches word1 150, then a search query completion suggestion (not depicted) including the first query component/word1 150 will be permitted (e.g., generated) by default, unless the suggested second query component (not depicted) matches any ban marker, such as the ban marker word3 154 associated with the word1 150 in the list of ban and unban markers 148. Responsive to a determination that the suggested second query component (not depicted) matches the ban marker word3 154 associated with the word1 150 in the list of ban and unban markers 148, the search query completion suggestion (not depicted) containing the word1 150 and the word3 154 is not generated.

Word2 152 is associated with an unban marker, indicated by the phrase "NEED_UNBAN_MARKER" in the depicted non-limiting embodiment shown in FIG. 2. Accordingly, if the first query component (not depicted) matches word2 152, then a search query completion suggestion (not depicted) including the first query component/word2 152 will not be permitted (e.g., not generated), unless the suggested second query component (not depicted) matches any unban marker, such as the unban marker word4 156 associated with the word2 152 in the list of ban and unban markers 148. Responsive to a determination that the suggested second query component (not depicted) matches the unban marker word4 156 associated with the word2 152 in the list of ban and unban markers 148, the search query completion suggestion (not depicted) containing the word2 152 and the word4 156 is generated.

For the purposes of illustration, it shall be assumed that a given user is interested in learning more about heroin. To that end, the given user has started entering "heroin" or a portion of a search query "heroin" into the search query interface 106. According to embodiments of the present technology and, as will be described in greater detail below, the server 116 is configured to cause the search application 104 to output search query completion suggestions (not depicted). According to the non-limiting embodiments of the present technology, the server 116 causes the search application 104 to display the search query completion suggestions (not depicted) below the search query interface 106.

Continuing with the example presented above, the at least a portion of the search query is parsed to determine a first query component. In the example presented above, the first query component is the same as the search query, "heroin". The server generates a suggested second query component related to the first query component. Examples of possible suggested second query components include, without limitation, "use", "buy", "side effects", "addiction", etc. It will be appreciated that many other second query component suggestions are possible. It should also be appreciated that the number of suggested second query components generated is not limited, i.e., one, more than one, or a plurality of suggested second query components related to the first query component may be generated.

Continuing with the example presented above, the suggested second query component "side effects" is generated in relation to the first query component "heroin". The list of potentially banned words 146 is accessed and it is determined that the first query component matches the potentially banned word "heroin", which is associated with an unban marker. In other words, search query completion suggestions including the word "heroin" will be banned (will not be generated), unless the suggested second query component is found on the list of unban markers associated with the word "heroin".

Next, the list of ban and unban markers 148 is accessed to determine if the suggested second query component, "side effects", is an unban marker for "heroin". If "side effects" is an unban marker for "heroin", then the search query completion suggestion "heroin side effects" is generated, and displayed below the search query interface 106. If "side effects" is not an unban marker for "heroin", then the search query completion suggestion "heroin side effects" would not be generated. In the illustrative example discussed here, it can be assumed that "side effects" is an unban marker for heroin, and the search query completion suggestion "heroin side effects" is generated (not banned).

If another suggested second query component for the first query component "heroin" is generated, then the method is repeated. Continuing with the example presented above, suppose suggested second query component "buy" is generated for the first query component "heroin". If "buy" is an unban marker for "heroin", then the search query completion suggestion "heroin buy" is generated, and displayed below the search query interface 106. If "buy" is not an unban marker for "heroin", then the search query completion suggestion "heroin buy" would not be generated. In the illustrative example discussed here, it can be assumed that "buy" is not an unban marker for heroin, and the search query completion suggestion "heroin buy" is not generated (is banned).

For the purposes of further illustration, it shall now be assumed that a given user is interested in learning more about Molly Ringwald. To that end, the given user has started entering "Molly Ringwald" or a portion of the search query, such as "Molly", into the search query interface 106. The list of potentially banned words 146 is accessed and it is determined that the first query component "Molly" matches the potentially banned word "Molly", which is associated with a ban marker. In other words, search query completion suggestions including the word "Molly" will not be banned (will be generated), unless the suggested second query component is found on the list of ban markers associated with the word "Molly".

Next, the suggested second query component "Ringwald" related to the first query component "Molly" is generated. The list of ban and unban markers 148 is accessed to determine if the suggested second query component, "Ringwald", is a ban marker for "Molly". If "Ringwald" is a ban marker for "Molly", then the search query completion suggestion "Molly Ringwald" is not generated. If "Ringwald" is not a ban marker for "Molly", then the search query completion suggestion "Molly Ringwald" would be generated and displayed below the search query interface 106. In the illustrative example discussed here, it can be assumed that "Ringwald" is not a ban marker for Molly, and the search query completion suggestion "Molly Ringwald" is generated (is not banned). Continuing with this example, suppose the suggested second query component "buy drug" is generated for the first query component "Molly". It can be assumed that "buy drug" is a ban marker for Molly, and the search query completion suggestion "Molly buy drug" would not be generated (is banned).

Generally speaking, search query completion suggestions (not depicted) are presented in a distinct area of the search application 104. In some embodiments, the distinct area is at the top of the search result page or SERP 108. However, in alternative embodiments of the present technology, the placement of the search query completion suggestions (not depicted) can be different. In some embodiments of the present technology, the search query completion suggestions (not depicted) can be split into separate distinct areas and, in a sense, mixed with the rest of the information displayed within SERP 108. As is known by those skilled in the art, other implementations are possible. Further, although the illustrative examples provided herein refer to the suggested second query components as words, other implementations are possible, as is known in the art. The suggested second query components are not particularly limited and may be image-related, audio-related, and the like.

In some embodiments of the present technology, the search query completion suggestions (not depicted) appear the moment the user has typed enough of a search query or at least a portion thereof into the search query interface 106 to enable search query completion suggestion processing, as will be described further below. In other words, the search query completion suggestions can appear automatically in a sense of not requiring the user to take any affirmative actions. Alternatively, it is possible that the search query completion suggestions appear in response to the user positively indicating his or her intent to use search query completion suggestion function.

In the depicted illustrative embodiment in FIG. 2, two potentially banned words are shown (a first potentially banned word, word1 150, and a second potentially banned word, word2 152) and one ban or unban marker for each potentially banned word is shown (ban marker word3 154 associated with word1 150 and unban marker word4 156 associated with word2 152). It should be expressly understood that the number of suggested second query components generated for a given first query component, the number of ban or unban markers associated with the given first query component, and the number of search query completion suggestions generated are not particularly limited.

For example, in some embodiments of the present technology, a single row of search query completion suggestions (not depicted) is displayed. In alternative non-limiting embodiments of the present technology, at least two or more rows of search query completion suggestions are displayed. Alternatively or additionally, the number of displayed search query completion suggestions can be dynamic, for example, based on the subject of the search query. In other words, as the suggestion module 142 generates additional alternatives for the search query completion suggestions, the number of suggestions displayed in the search results interface 108 can be dynamically increased. It should be expressly understood that neither the number of search query completion suggestions displayed on a single row nor the number of rows is particularly limited.

Figure 3:
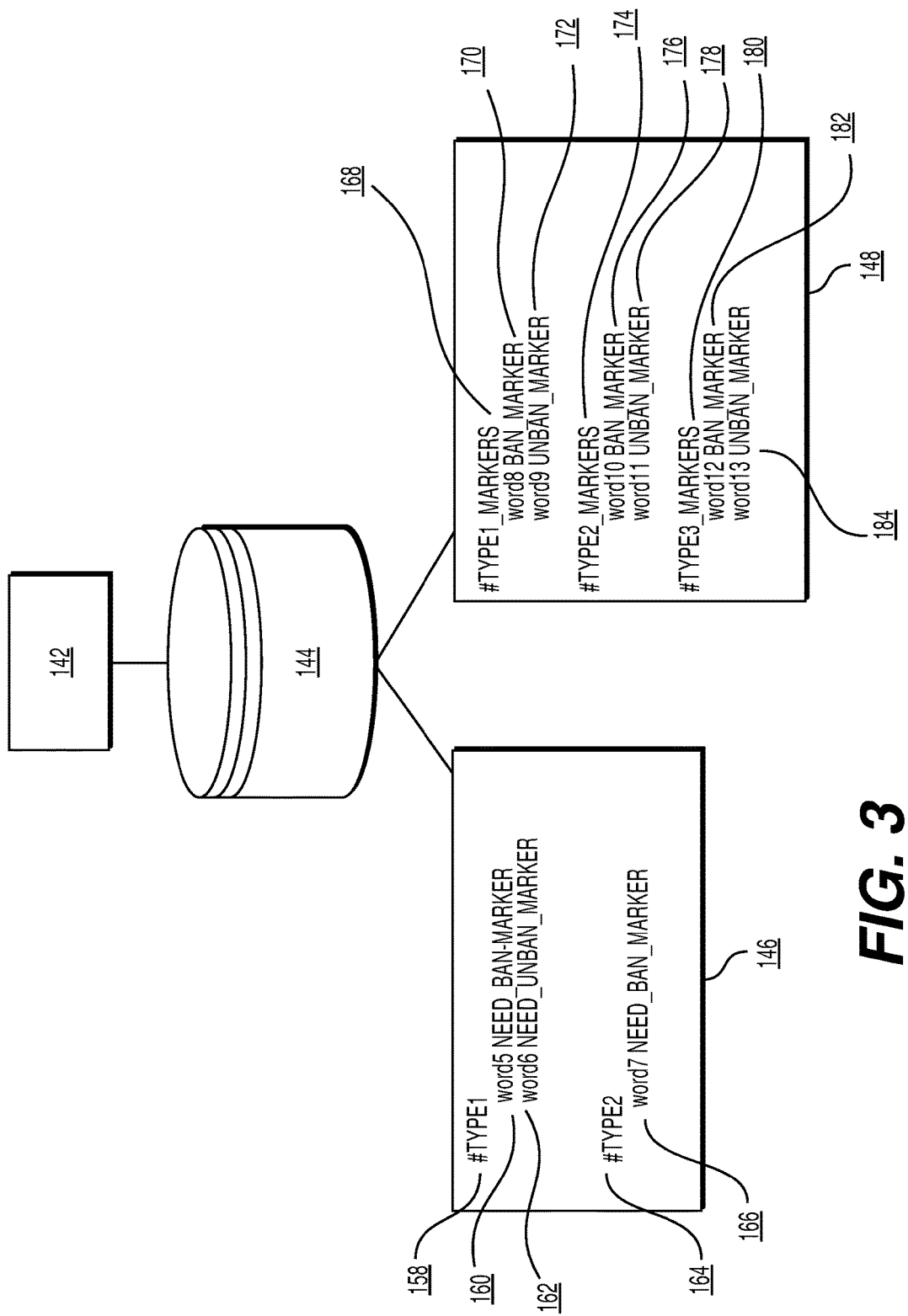
FIG. 3 is a schematic representation of the suggestion module and the associated database of the system of FIG. 1, the suggestion module and the associated database being implemented in accordance with other non-limiting embodiments of the present technology.

In order to fully appreciate implementations of the present technology, another non-limiting example of the suggestion module 142 and database 144 is depicted schematically in FIG. 3. In the depicted non-limiting embodiment shown in FIG. 3, the potentially banned words word5 160, word6 162, and word7 166 are grouped by type (e.g., type1 158, type2 164) in the list of potentially banned words 146. For example, type1 158 may be "drugs" and the potentially banned words word5 160 and word6 162 are "Coke" and "Heroin", respectively. As illustrated in FIG. 3, word5 160 ("Coke") is associated with a ban marker, and word6 162 ("Heroin") is associated with an unban marker. To provide another example, type2 164 may be "people" and the potentially banned word7 166 is "Molly", which is associated with a ban marker.

Further, in the depicted non-limiting embodiment shown in FIG. 3, the list of ban and unban markers 148 lists the markers according to the type 158, 164 of the potentially banned word 160, 162, 166. Word8 170 and word9 172 represent ban and unban markers, respectively, associated with potentially banned words of type1 158 (and are thus listed as type1 markers 168). Similarly, word10 176 and word11 178 are ban and unban markers respectively associated with potentially banned words of type2 164 (and are thus listed as type2 markers 174). Word12 182 and word13 184 are ban and unban markers respectively associated with potentially banned words of type3 (not depicted), and are thus listed as type3 markers 180. To continue with the example described above, type1 markers 168 may be drug markers, the ban marker word8 170 is "cooking" and the unban marker word9 172 is "side effects". Type2 markers 174 are people markers, the ban marker word10 176 is "kill" and the unban marker word11 178 is "kill horror video".

Thus, in non-limiting implementations such as those illustrated in FIG. 3, a list of ban or unban markers corresponding to the type 158, 164 of potentially banned word is accessed, in order to determine whether there is a match with the suggested second query component.

In further non-limiting implementations depicted in FIG. 3, type2 markers 174 and type3 markers 180 may represent different subsets of markers corresponding to the type2 164 of potentially banned word 166. For example, where the type2 164 is "people", type2 markers 174 may be "people curses markers" (such as ban marker word10 176 "damn" and unban marker word11 178 "damn nice") whereas type3 markers 180 are "people action markers" (such as ban marker word 12 182 "kill" and unban marker word13 184 "kill horror video"). Many types of ban and unban markers can correspond to each type 158, 164 of potentially banned word 160, 164, 166. It should be expressly understood that the organization, type, and number of potentially banned words, ban markers, and unban markers is not particularly limited.

Now, we will turn our attention to how the server 116 generates the above-mentioned examples of search query completion suggestion. When the user enters at least a portion of the search query into the search query interface 106, the server 116 is configured to acquire an indication of the portion of the search query over the communication link 112 and to transmit the portion of the search query to the suggestion module 142. The suggestion module 142 is configured to parse the at least a portion of the search query to determine a first query component and to generate one or more suggested second query components related to the first query component. In one example of a non-limiting embodiment, the suggestion module 142 can access the above-mentioned database 144. In some embodiments, the suggestion module 142 may access a plurality of databases (not depicted). How the suggestion module 142 generates the suggested second query components is not particularly limited and may include one or more of: (i) statistical popularity of a given suggested second query component based at least partially on past related search queries; (ii) user-specific popularity of the given suggested second query component; (iii) how often a particular suggested second query component is typically searched along with the at least a portion of the search query; and (iv) other auxiliary information associated with past searches executed by other (or the same) user.

Given the architecture described with reference to FIG. 1 and examples provided in FIGS. 2 and 3, it is possible to execute a method of selecting a search query completion suggestion for a search query or at least a portion thereof. The method of selecting a search query completion suggestion can be conveniently executed on the server 116. To that end, the server includes computer usable information storage medium storing computer instructions, which instructions when executed, cause the server 116 to execute steps of the method described herein below.

Figure 4:
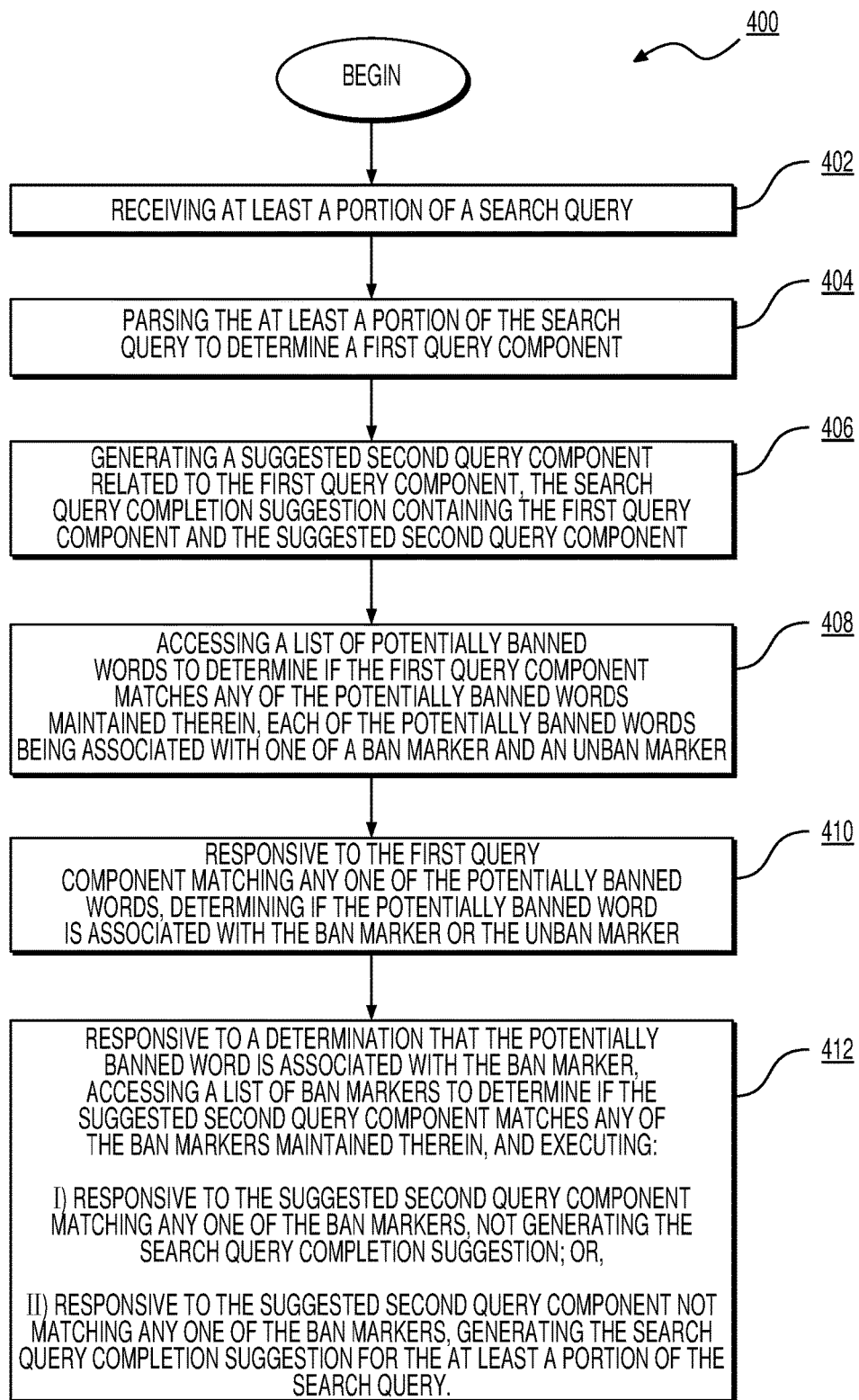
FIG. 4 depicts a block diagram of a method, the method being executable within the system of FIG. 1 and being implemented in accordance with non-limiting embodiments of the present technology.
Figure 4:
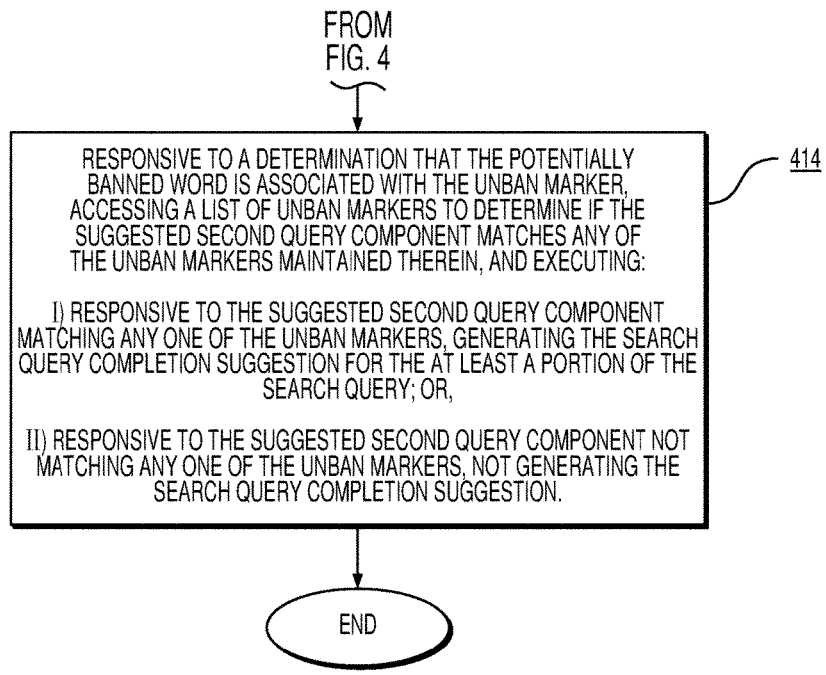

Reference will now be made to FIG. 4, which depicts a block diagram of a method 400, the method 400 being implemented in accordance with a non-limiting embodiment of the present technology.

Step 402—receiving at least a portion of a search query

The method 400 begins at step 402, where the server 116 receives a search query or at least a portion thereof from the electronic device 102 associated with the user (not depicted). The step 402 is executed in response to the user entering a search query or at least a portion of the search query into the electronic device 102 using the search query interface 106 of the search application 104. As has been mentioned above, step 402 can be executed automatically, or the user may need to indicate his or her desire to implement step 402. The indication of the desire may be received in real time (for example, by the user clicking a dedicated button) or as part of setting or set up of the search application 104. The server 116 receives the portion of the search query over the communication link 112.

In some non-limiting embodiments of the present technology, the search query or the at least a portion thereof is transmitted to the server 116 as a standard URL (i.e., a link) encoded in HTML format. In other embodiments of the present technology, the search query or the at least a portion thereof is transmitted in a MYSQ1 script. The latter is particularly useful in, but is not limited to, those non-limiting embodiments where the server 116 is implemented as an SQL server.

The method then proceeds to execution of step 404.

Step 404—parsing the at least a portion of the search query to determine a first query component The method 400 proceeds to step 404, where the server 116 causes the suggestion module 142 to parse the at least a portion of the search query to determine a first query component. The first query component may contain all or a portion of the at least a portion of the search query received in step 402. In some non-limiting implementations, a plurality of first query components is determined. For example, in the case where the at least a portion of the search query contains multiple words, multiple first query components, each containing one of the multiple words in the at least a portion of the search query, may be determined. The first query component may contain one word or more than one word.

The method then proceeds to execution of step 406.

Step 406—generating a suggested second query component related to the first query component, the search query completion suggestion containing the first query component and the suggested second query component The method 400 then proceeds to execution of step 406, where the server 116 causes the suggestion module 142 to generate a suggested second query component related to the first query component, the search query completion suggestion containing the first query component and the suggested second query component.

In accordance with non-limiting embodiments of the present technology, the suggested second query component may be generated based at least partially on past related search queries. For example, in non-limiting embodiments of the present technology, the suggested second query component is based on one or more of: (i) statistical popularity of a given suggested second query component; (ii) user-specific popularity of the given suggested second query component; (iii) how often the given suggested second query component is typically searched along with the at least a portion of the search query; and (iv) other auxiliary information associated with past searches executed by other (or the same) user.

The form of the suggested second query component is not particularly limited. The suggested second query component may contain one word or more than one word, in the case where the second query component is text-based. In alternative non-limiting embodiments of the present implementations, the suggested second query component may not be text-based, e.g., it may be image-based, audio-based, and the like. Many types of search query completion suggestions are known in the art and may be used in the present technology.

Once the suggested second query component has been generated, the method 400 then proceeds to execution of step 408.

Step 408—accessing a list of potentially banned words to determine if the first query component matches any of the potentially banned words maintained therein, each of the potentially banned words being associated with one of a ban marker and an unban marker The method 400 then executes step 408, where the server 116 causes the suggestion module 142 to access a list of potentially banned words 146 to determine if the first query component matches any of the potentially banned words 150, 152, 160, 162, 166 maintained therein, each of the potentially banned words 150, 152, 160, 162, 166 being associated with one of a ban marker 154, 170, 176, 182 and an unban marker 156, 172, 178, 184.

In some non-limiting implementations of step 408, the list of potentially banned words 146 is predetermined manually by an operator. The operator identifies potentially banned words 150, 152, 160, 162, 166 related for example to offensive, illegal or otherwise inadmissible content. The operator may be a single human assessor or a plurality of human assessors. In some cases, the list of potentially banned words 146 may be based on one or more factors such as user interest, past searching behavior, the nature of the subject matter in question, historical user search data, and other predetermined criteria.

In alternative non-limiting implementations of step 408, the list of potentially banned words 146 is predetermined using a machine-learned algorithm. The machine-learned algorithm for identifying potentially banned words 150, 152, 160, 162, 166 may be based on historical user search data and the like. Factors used to identify potentially banned words may be user-specific or, alternatively, may be statistical based on data from a sampling of users. Again, the list of potentially banned words 146 may be based on one or more factor such as user interest, past searching behavior, the nature of the subject matter in question, and other predetermined criteria.

In some non-limiting implementations of step 408, the potentially banned words 150, 152, 160, 162, 166 have been grouped by type 158, 164 in the list of potentially banned words 146. In some embodiments, therefore, the method 400 further comprises a step (not depicted) of determining the type 158, 164 of the potentially banned word 150, 152, 160, 162, 166 matching the first query component, prior to accessing the list of ban and unban markers 148.

Many categories or types of potentially banned words 150, 152, 160, 162, 166 are possible and the type 158, 164 is not particularly limited. In some non-limiting embodiments of the present technology, the type 158, 164 is one or more of drugs, people, people curses, people actions, adult content, illegal content, pornography, gambling, profanity, and sexual content.

The method 400 next proceeds to execution of step 410.

Step 410—responsive to the first query component matching any one of the potentially banned words, determining if the potentially banned word is associated with the ban marker or the unban marker Once it has been determined in step 408 if the first query component matches any of the potentially banned words 150, 152, 160, 162, 166 in the list of potentially banned words 146, the method continues with step 410. Each of the words 150, 152, 160, 162, 166 on the list of potentially banned words 146 is associated with one of a ban marker 154, 170, 176, 182 and an unban marker 156, 172, 178, 184. In step 410, it is determined if the particular potentially banned word 150, 152, 160, 162, 166 is associated with the ban marker 154, 170, 176, 182 or the unban marker 156, 172, 178, 184 in the list of potentially banned words 146.

In non-limiting embodiments where potentially banned word 150, 152, 160, 162, 166 is associated with ban marker 154, 170, 176, 182, the search query completion suggestion containing the first query component and the suggested second query component is generated (and displayed on the search result interface 108) as a default, unless the suggested second query component matches the ban marker 154, 170, 176, 182, in which case the search query completion suggestion is not generated.

In alternative non-limiting embodiments where potentially banned word 150, 152, 160, 162, 166 is associated with unban marker 156, 172, 178, 184, the search query completion suggestion containing the first query component and the suggested second query component is not generated as a default, unless the suggested second query component matches the unban marker 156, 172, 178, 184, in which case the search query completion suggestion is generated (and displayed on the search result interface 108).

The method 400 then proceeds to execution of step 412 or step 414.

Step 412—responsive to a determination that the potentially banned word is associated with the ban marker, accessing a list of ban markers to determine if the suggested second query component matches any of the ban markers maintained therein, and executing: i) responsive to the suggested second query component matching any one of the ban markers, not generating the search query completion suggestion; or, ii) responsive to the suggested second query component not matching any one of the ban markers, generating the search query completion suggestion for the at least a portion of the search query Step 414—responsive to a determination that the potentially banned word is associated with the unban marker, accessing a list of unban markers to determine if the suggested second query component matches any of the unban markers maintained therein, and executing: i) responsive to the suggested second query component matching any one of the unban markers, generating the search query completion suggestion for the at least a portion of the search query; or, ii) responsive to the suggested second query component not matching any one of the unban markers, not generating the search query completion suggestion Once it has been determined in step 410 if the potentially banned word 150, 152, 160, 162, 166 is associated with the ban marker 154, 170, 176, 182 or the unban marker 156, 172, 178, 184, the method continues with step 412 or step 414. In steps 412/414, the list of ban and unban markers 148 is accessed to determine if the suggested second query component matches any of the ban or unban markers maintained therein, and the search query completion suggestion is generated or not generated accordingly, as explained above.

In some non-limiting embodiments, the list of ban and unban markers 148 contains both ban and unban markers. In alternative non-limiting embodiments (not depicted), the ban and unban markers may be maintained in separate lists. For example, a list of ban markers may be accessed, and a separate list of unban markers may be accessed. The organization and structure of the lists of ban and unban markers 148 is not particularly limited.

In further non-limiting embodiments, the list of ban and unban markers 148 contains both ban and unban markers, wherein the ban markers 154, 170, 176, 182 and unban markers 156, 172, 178, 184 are organized according to the type 158, 164 of potentially banned word 150, 152, 160, 162, 166 to which they correspond. In such embodiments, the list of ban and unban markers 148 corresponding to the type 158, 164 of potentially banned word 150, 152, 160, 162, 166 may be accessed to determine if the suggested second query component matches any of the ban/unban markers maintained therein. In some non-limiting embodiments, the list of ban markers accessed in step 412 and/or the list of unban markers accessed in step 414 comprises only ban or unban markers respectively corresponding to the type 158, 164 of potentially banned word 150, 152, 160, 162, 166 matching the first query component.

In some non-limiting implementations, the list of ban and unban markers 148 is predetermined manually by an operator. The operator may be a single human assessor or a plurality of human assessors. In some cases, the list of ban and unban markers 148 may be based on one or more factor such as user interest, past searching behavior, the nature of the subject matter in question, historical user search data, and other predetermined criteria.

In alternative non-limiting implementations, the list of ban and unban markers 148 is predetermined using a machine-learned algorithm. The machine-learned algorithm may be based on historical user search data and the like and may be based on one or more factor such as user interest, past searching behavior, the nature of the subject matter in question, and other predetermined criteria.

In some non-limiting implementations of the present technology, the search query completion suggestions are displayed to the user while the user is entering the at least a portion of the search query. For example, the user may have entered only a partial search query, or may be in the process of entering the search query. Continuing with the above example, the user may have entered only "Molly" in the search query interface 106. In alternative non-limiting implementations, the search query completion suggestions are displayed to the user after the user has completed entering the at least a portion of the search query, but before the search has been executed. For example, the user has entered "Molly Ringwald" in the search query interface 106, but the search has not yet been executed.

It should be expressly understood that the display of the search query completion suggestions to the user is not particularly limited. For example, the number, the location, and the format of search query completion suggestions are not limited.

From one perspective, embodiments of the present technology described above can be summarized as follows, structured in numbered clauses:

(1) A method (400) of selecting a search query completion suggestion, the method executable at a server (116), the method comprising:
 a) receiving at least a portion of a search query;
 b) parsing the at least a portion of the search query to determine a first query component;
 c) generating a suggested second query component related to the first query component, the search query completion suggestion containing the first query component and the suggested second query component;
 d) accessing a list of potentially banned words (146) to determine if the first query component matches any of the potentially banned words (150, 152, 160, 162, 166) maintained therein, each of the potentially banned words (150, 152, 160, 162, 166) being associated with one of a ban marker (154, 170, 176, 182) and an unban marker (156, 172, 178, 184);
 e) responsive to the first query component matching any one of the potentially banned words (150, 152, 160, 162, 166), determining if the potentially banned word (150, 152, 160, 162, 166) is associated with the ban marker (154, 170, 176, 182) or the unban marker (156, 172, 178, 184);
 f) responsive to a determination that the potentially banned word (150, 152, 160, 162, 166) is associated with the ban marker (154, 170, 176, 182), accessing a list of ban markers to determine if the suggested second query component matches any of the ban markers (154, 170, 176, 182) maintained therein, and executing: i) responsive to the suggested second query component matching any one of the ban markers (154, 170, 176, 182), not generating the search query completion suggestion; or, ii) responsive to the suggested second query component not matching any one of the ban markers (154, 170, 176, 182), generating the search query completion suggestion for the at least a portion of the search query;
 g) responsive to a determination that the potentially banned word (150, 152, 160, 162, 166) is associated with the unban marker (156, 172, 178, 184), accessing a list of unban markers to determine if the suggested second query component matches any of the unban markers (156, 172, 178, 184) maintained therein, and executing: i) responsive to the suggested second query component matching any one of the unban markers (156, 172, 178, 184), generating the search query completion suggestion for the at least a portion of the search query; or, ii) responsive to the suggested second query component not matching any one of the unban markers (156, 172, 178, 184), not generating the search query completion suggestion.

(2) The method as described in clause (1) above, wherein the potentially banned words (150, 152, 160, 162, 166) in the list of potentially banned words (146) have been grouped by type (158, 164).

(3) The method as described in clause (2) above, wherein the method further comprises determining the type (158, 162) of potentially banned word (150, 152, 160, 162, 166) matching the first query component, prior to accessing the list of ban markers in step f) or the list of unban markers in step g).

(4) The method as described in clause (3) above, wherein the list of ban markers accessed in step f) comprises only ban markers (154, 170, 176, 182) corresponding to the type (158, 164) of potentially banned word (150, 152, 160, 162, 166) matching the first query component.

(5) The method as described in clause (3) above, wherein the list of unban markers accessed in step g) comprises only unban markers (156, 172, 178, 184) corresponding to the type (158, 164) of potentially banned word (150, 152, 160, 162, 166) matching the first query component.

(6) The method as described in any one of clauses (1) to (5) above, wherein responsive to determination that the potentially banned word (150, 152, 160, 162, 166) is associated with neither a ban marker (154, 170, 176, 182) nor an unban marker (156, 172, 178, 184), steps f) and g) are not executed and the search query completion suggestion is not generated.

(7) The method as described in any one of clauses (3) to (6) above, wherein the type (158, 164) is one or more of drugs, people, people curses, people actions, adult content, illegal content, pornography, gambling, profanity, and sexual content.

(8) The method as described in any one of clauses (1) to (7) above, wherein the first query component and the suggested second query component independently comprise one or more than one word.

(9) The method as described in any one of clauses (1) to (8) above, wherein one or more of the list of potentially banned words (146), the list of ban markers, and the list of unban markers had been predetermined manually by an operator.

(10) The method as described in any one of clauses (1) to (8) above, wherein one or more of the list of potentially banned words (146), the list of ban markers, and the list of unban markers had been predetermined using a machine-learned algorithm.

(11) The method as described in clause (10) above, wherein the machine-learned algorithm had been generated based on historical user search data.

(12) The method as described in any one of clauses (1) to (11) above, wherein the suggested second query component is generated based at least partially on past related search queries.

(13) The method as described in clause (12) above, wherein the suggested second query component is generated based on one or more of: (i) statistical popularity of a given suggested second query component; (ii) user-specific popularity of the given suggested second query component; (iii) how often the given suggested second query component is typically searched along with the at least a portion of the search query; and (iv) other auxiliary information.

(14) A server (116) comprising:

a communication interface for communication with an electronic device (102) associated with a user via a communication network (112);

a memory storage;

a processor operationally connected with the communication interface and the memory storage, the processor configured to store objects, in association with the user, on the memory storage, the processor being further configured to:

a) receive at least a portion of a search query from the electronic device (102);

b) parse the at least a portion of the search query to determine a first query component;

c) generate a suggested second query component related to the first query component, and generate a search query completion suggestion containing the first query component and the suggested second query component;

d) access a list of potentially banned words (146) to determine if the first query component matches any of the potentially banned words (150, 152, 160, 162, 166) maintained therein, each of the potentially banned words (150, 152, 160, 162, 166) being associated with one of a ban marker (154, 170, 176, 182) and an unban marker (156, 172, 178, 184);

e) responsive to the first query component matching any one of the potentially banned words (150, 152, 160, 162, 166), determine if the potentially banned word (150, 152, 160, 162, 166) is associated with the ban marker (154, 170, 176, 182) or the unban marker (156, 172, 178, 184);

f) responsive to a determination that the potentially banned word (150, 152, 160, 162, 166) is associated with the ban marker (154, 170, 176, 182), access a list of ban markers to determine if the suggested second query component matches any of the ban markers (154, 170, 176, 182) maintained therein, and execute: i) responsive to the suggested second query component matching any one of the ban markers (154, 170, 176, 182), not generate the search query completion suggestion; or, ii) responsive to the suggested second query component not matching any one of the ban markers (154, 170, 176, 182), generate the search query completion suggestion for the at least a portion of the search query;

g) responsive to a determination that the potentially banned word (150, 152, 160, 162, 166) is associated with the unban marker (156, 172, 178, 184), access a list of unban markers to determine if the suggested second query component matches any of the unban markers (156, 172, 178, 184) maintained therein, and execute: i) responsive to the suggested second query component matching any one of the unban markers (156, 172, 178, 184), generate the search query completion suggestion for the at least a portion of the search query; or, ii) responsive to the suggested second query component not matching any one of the unban markers (156, 172, 178, 184), not generate the search query completion suggestion.

(15) The server as described in clause (14) above, wherein the potentially banned words (150, 152, 160, 162, 166) in the list of potentially banned words (146) have been grouped by type.

(16) The server as described in clause (15) above, wherein the processor is further configured to determine the type (158, 164) of potentially banned word (150, 152, 160, 162, 166) matching the first query component, prior to accessing the list of ban markers in step f) or the list of unban markers in step g).

(17) The server as described in clause (16) above, wherein the list of ban markers accessed in step f) comprises only ban markers corresponding to the type (158, 164) of potentially banned word (150, 152, 160, 162, 166) matching the first query component.

(18) The server as described in clause (16) above, wherein the list of unban markers accessed in step g) comprises only unban markers (156, 172, 178, 184) corresponding to the type (158, 164) of potentially banned word (150, 152, 160, 162, 166) matching the first query component.

(19) The server as described in any one of clauses (14) to (18) above, wherein the processor is further configured to, responsive to determination that the potentially banned word (150, 152, 160, 162, 166) is associated with neither a ban marker (154, 170, 176, 182) nor an unban marker (156, 172, 178, 184), not execute steps f) and g) and not generate the search query completion suggestion.

(20) The server as described in any one of clauses (16) to (19) above, wherein the type is one or more of drugs, people, people curses, people actions, adult content, illegal content, pornography, gambling, profanity, and sexual content.

(21) The server as described in any one of clauses (14) to (20) above, wherein the first query component and the suggested second query component independently comprise one or more than one word.

(22) The server as described in any one of clauses (14) to (21) above, wherein one or more of the list of potentially banned words (146), the list of ban markers, and the list of unban markers had been predetermined manually by an operator.

(23) The server as described in any one of clauses (14) to (21) above, wherein one or more of the list of potentially banned words (146), the list of ban markers, and the list of unban markers had been predetermined using a machine-learned algorithm.

(24) The server as described in clause (23) above, wherein the machine-learned algorithm had been generated based on historical user search data.

(25) The server as described in any one of clauses (14) to (24) above, wherein the processor is configured to generate the suggested second query component based at least partially on past related search queries.

(26) The server as described in clause (25) above, wherein the processor is configured to generate the suggested second query component based on one or more of: (i) statistical popularity of a given suggested second query component; (ii) user-specific popularity of the given suggested second query component; (iii) how often the given suggested second query component is typically searched along with the at least a portion of the search query; and (iv) other auxiliary information.

Some technical effects of non-limiting embodiments of the present technology may include provision of desired or admissible search query completion suggestions to the user, in response to the user entering at least a portion of a search query, while filtering out or removing inadmissible search query completion suggestions (such as those containing offensive language, relating to illegal activities, and the like). This provision of search suggestions can allow the user to delve more deeply into a subject of interest. This provision may further allow the user to find more efficiently the information he or she is looking for. Allowing the user to more efficiently find information also results in less bandwidth usage. Also, with the electronic device 102 being implemented as a wireless communication device, ability to more efficiently find information would result in conservation of battery power of the electronic device 102. The present technology can also provide the user with a more attractive search interface or search results page by excluding inadmissible search query completion suggestions. It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of selecting and displaying a search query completion suggestion on an electronic device, the method executable at a server in communication with the electronic device, the method comprising:
a) receiving, by the server, at least a portion of a search query from the electronic device;
b) parsing, at the server, the at least a portion of the search query to determine a first query component;
c) generating, at a suggestion module of the server, a suggested second query component related to the first query component;
d) analyzing, at the suggestion module of the server, the first query component by accessing a list of potentially banned words in a database to determine if the first query component matches any of the potentially banned words maintained therein, each of the potentially banned words being associated with one of a ban marker and an unban marker;
e) responsive to the first query component matching a potentially banned word, determining, at the suggestion module of the server, if the potentially banned word is associated with the ban marker or the unban marker;
f) responsive to the first query component matching the potentially banned word and responsive to a determination that the potentially banned word is associated with the ban marker, analyzing the suggested second query component by accessing a list of ban markers in the database associated with the first query component to determine if the suggested second query component matches any of the ban markers maintained therein, and executing:
   i) responsive to the suggested second query component matching any one of the ban markers associated with the first query component, not generating the search query completion suggestion;
   ii) responsive to the suggested second query component not matching any one of the ban markers associated with the first query component,
      generating the search query completion suggestion for the at least a portion of the search query, the search query completion suggestion containing the first query component and the suggested second query component, and
      causing, by the server, the electronic device to display the search query completion suggestion;
g) responsive to the first query component matching the potentially banned word and responsive to a determination that the potentially banned word is associated with the unban marker, analyzing the suggested second query component by accessing a list of unban markers in the database associated with the first query component to determine if the suggested second query component matches any of the unban markers maintained therein, and executing:
   i) responsive to the suggested second query component matching any one of the unban markers associated with the first query component,
      generating the search query completion suggestion for the at least a portion of the search query, the search query completion suggestion containing the first query component and the suggested second query component, and
      causing, by the server, the electronic device to display the search query completion suggestion;
   ii) responsive to the suggested second query component not matching any one of the unban markers associated with the first query component, not generating the search query completion suggestion.

2. The method of claim 1, wherein the potentially banned words in the list of potentially banned words have been grouped by type.

3. The method of claim 2, wherein the method further comprises determining the type of potentially banned word matching the first query component, prior to accessing the list of ban markers in step f) or the list of unban markers in step g).

4. The method of claim 3, wherein the list of ban markers accessed in step f) comprises only ban markers corresponding to the type of potentially banned word matching the first query component.

5. The method of claim 3, wherein the list of unban markers accessed in step g) comprises only unban markers corresponding to the type of potentially banned word matching the first query component.

6. The method of claim 5, wherein responsive to determination that the potentially banned word is associated with neither a ban marker nor an unban marker, steps f) and g) are not executed and the search query completion suggestion is not generated.

7. The method of claim 6, wherein the type is one or more of drugs, people, people curses, people actions, adult content, illegal content, pornography, gambling, profanity, and sexual content.

8. The method of claim 7, wherein the first query component and the suggested second query component independently comprise one or more than one word.

9. The method of claim 8, wherein one or more of the list of potentially banned words, the list of ban markers, and the list of unban markers had been predetermined manually by an operator.

10. The method of claim 8, wherein one or more of the list of potentially banned words, the list of ban markers, and the list of unban markers had been predetermined using a machine-learned algorithm.

11. The method of claim 10, wherein the machine-learned algorithm had been generated based on historical user search data.

12. The method of claim 11, wherein the suggested second query component is generated based at least partially on past related search queries.

13. The method of claim 12, wherein the suggested second query component is generated based on one or more of: (i) statistical popularity of a given suggested second query component; (ii) user-specific popularity of the given suggested second query component; (iii) how often the given suggested second query component is typically searched along with the at least a portion of the search query; and (iv) other auxiliary information.

14. A server, in communication with an electronic device, the server comprising:
 a communication interface for communication with the electronic device associated with a user via a communication network;
 a memory storage having a database;
 a processor operationally connected with the communication interface and the memory storage, the processor configured to store objects, in association with the user, on the memory storage, the processor being further configured to:
 a) receive at least a portion of a search query from the electronic device;
 b) parse the at least a portion of the search query to determine a first query component;
 c) generate, at a suggestion module, a suggested second query component related to the first query component;
 d) analyze, at the suggestion module, the first query component by accessing a list of potentially banned words in the database to determine if the first query component matches any of the potentially banned words maintained therein, each of the potentially banned words being associated with one of a ban marker and an unban marker;
 e) responsive to the first query component matching a potentially banned word, determine, at the suggestion module, if the potentially banned word is associated with the ban marker or the unban marker;
 f) responsive to the first query component matching the potentially banned word and responsive to a determination that the potentially banned word is associated with the ban marker, analyze the suggested second query component by accessing, in the database, a list of ban markers associated with the first query component to determine if the suggested second query component matches any of the ban markers maintained therein, and execute:
  i) responsive to the suggested second query component matching any one of the ban markers associated with the first query component, not generate the search query completion suggestion;
  ii) responsive to the suggested second query component not matching any one of the ban markers associated with the first query component,
   generate the search query completion suggestion for the at least a portion of the search query, the search query completion suggestion containing the first query component and the suggested second query component, and
   cause, by the server, the electronic device to display the search query completion suggestion;
 g) responsive to the first query component matching the potentially banned word and responsive to a determination that the potentially banned word is associated with the unban marker, analyze the suggested second query component by accessing, in the database, a list of unban markers associated with the first query component to determine if the suggested second query component matches any of the unban markers maintained therein, and execute:
  i) responsive to the suggested second query component matching any one of the unban markers associated with the first query component,
   generate the search query completion suggestion for the at least a portion of the search query, the search query completion suggestion containing the first query component and the suggested second query component, and
   cause, by the server, the electronic device to display the search query completion suggestion;
  ii) responsive to the suggested second query component not matching any one of the unban markers associated with the first query component, not generate the search query completion suggestion.

15. The server of claim 14, wherein the potentially banned words in the list of potentially banned words have been grouped by type.

16. The server of claim 15, wherein the processor is further configured to determine the type of potentially banned word matching the first query component, prior to accessing the list of ban markers in step f) or the list of unban markers in step g).

17. The server of claim 16, wherein the list of ban markers accessed in step f) comprises only ban markers corresponding to the type of potentially banned word matching the first query component.

18. The server of claim 16, wherein the list of unban markers accessed in step g) comprises only unban markers corresponding to the type of potentially banned word matching the first query component.

19. The server of claim 18, wherein the processor is further configured to, responsive to determination that the potentially banned word is associated with neither a ban marker nor an unban marker, not execute steps f) and g) and not generate the search query completion suggestion.

20. The server of claim 19, wherein the type is one or more of drugs, people, people curses, people actions, adult content, illegal content, pornography, gambling, profanity, and sexual content.

* * * * *